Oct. 19, 1965 J. C. McADAM 3,213,324

VARIABLE COOLER UNIT

Filed Sept. 12, 1962 2 Sheets-Sheet 1

JOHN C. McADAM
INVENTOR.

BY
Beehler & Shanahan

ATTORNEYS

JOHN C. McADAM
INVENTOR.

BY
Beehler & Shanahan
ATTORNEYS

3,213,324
VARIABLE COOLER UNIT

John C. McAdam, Burbank, Calif., assignor, by mesne assignments, to International Electronic Research Corporation, a corporation of California Filed Sept. 12, 1962, Ser. No. 223,170
7 Claims. (Cl. 317—100)

This is a continuation-in-part of co-pending application Serial No. 119,587, filed June 26, 1961.

The invention relates to heat dissipating devices of a type especially well adapted to the cooling of electronic components such, for example, as transistors and components of a somewhat compact nature which can be cooled either with or without the aid of an induced flow of air over the cooler. The device here under consideration is one having a base construction of indeterminate length and configuration arranged in such fashion that it can be cut and bent at predetermined locations to make any one of a number of different types of coolers of different capacities from the same piece of original stock.

It is commonly recognized that except for small audio installations cooling of transistors during operation is very beneficial to dependable, uniform performance. Moreover, in certain electronc circuits where an extremely great dependability is required, different transistors performing allotted tasks need to be subjected to precisely the correct temperature conditions to make certain of their precise timing in the circuit. In other types of circuits where appreciable heat is generated, the greater need is for a rapid and effective dissipation of the heat thus generated as long as the heat transistor is in operation. It is also true that with respect to transistors, heat dissipation must be thoroughly depended upon in that unlike electronic tubes if a transistor is once overheated, the substances of the transistor including the bonding agents therebetween will become permanently damaged.

Because transistors are employed in a tremendously great variety of sizes and capacities as well as varieties of uses, coolers for such transistors must be supplied in a corresponding variety of capacities. Although many types and kinds of transistor coolers have been devised heretofore, each to meet some special need, the variety has become so great that inventory problems have become staggering. Since in many instances each new environment and demand often has to be specially met, even a large and varied inventory of the types of transistors heretofore available may not always be adequate to meet each individual need. Special coolers for each and every variety of use results in the cost of cooling by this means being unnecessarily high.

It is therefore among the objects of the invention to provide a new and improved variable cooler device for electonic components which is possessed of a single basic design of such character that from the basic design which can be inventoried in appreciable quantities, a great variety of individual coolers can be formed to meet a corresponding variety of needs by merely making one or another simple variation in the basic structure.

Another object of the invention is to provide a new and improved variable cooler device for electronic components which can be constructed as a basic strip of sheet metal of indeterminate length marked and cut in a basic conventional pattern such that the same strip of sheet metal can be bent wherever desired into a pattern of heat radiating fingers on either one face or two faces and also throughout portions intermediate the side edges on either one face or both faces, the same strip of sheet metal further being capable of having portions bent therefrom to provide mounting brackets extending in one angle or another in virtually any manner which might be needed to accommodate a great variety of installations.

Still another object of the invention is to provide a new and improved variable cooler device for electronic components in the nature of transistors of different sizes and capacities which is of a simple basic design and where variety may be accomplished merely by providing strips of relatively few different width and gauge scored in a simple basic pattern so that whenever desired pieces may be cut from the strip and bent to provide heat dissipating fingers forming enclosure patterns such that the individual enclosures can serve either singly as coolers of moderate capacity or may be nested one within another or otherwise arranged with respect to each other to provide coolers of relatively greater capacity but occupying no more space than the coolers of lesser capacity.

Still further among the objects of the invention is to provide a new and improved variable cooler device especially adapted to the mounting and cooling of transistors which is sufficiently insulated electrically to insure all electrical leads and even the casing of the transistor itself against accidental grounding but wherein the electrical insulation does not impair the ability of the cooler device to transmit heat away from the transistor, thereby to further assist in cooling by conduction.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a fragmentary perspective view of the strip initially punched or scored in a basic pattern from which fingers have been bent in a specifically selected direction as one example of a pattern of heat dissipating enclosure.

FIGURE 1*a* is a fragmentary perspective view of a strip showing fingers separated by slits prior to bending.

Figure 9:
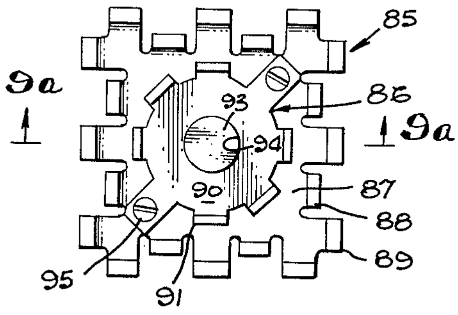
FIGURE 9 is a plan view of still another form of nested arrangement.
Figure 9A:
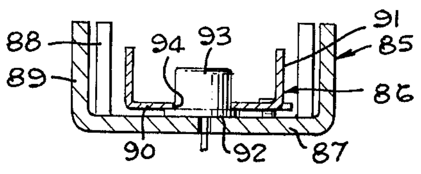

FIGURE 9*a* is a sectional view taken on the line 9*a*—9*a* of FIGURE 9.

Figure 10:
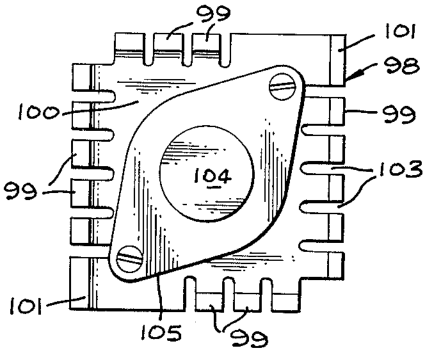

FIGURE 10 is a plan view of still another form of the device.

Figures 1, 1A, 2, 3, 4:
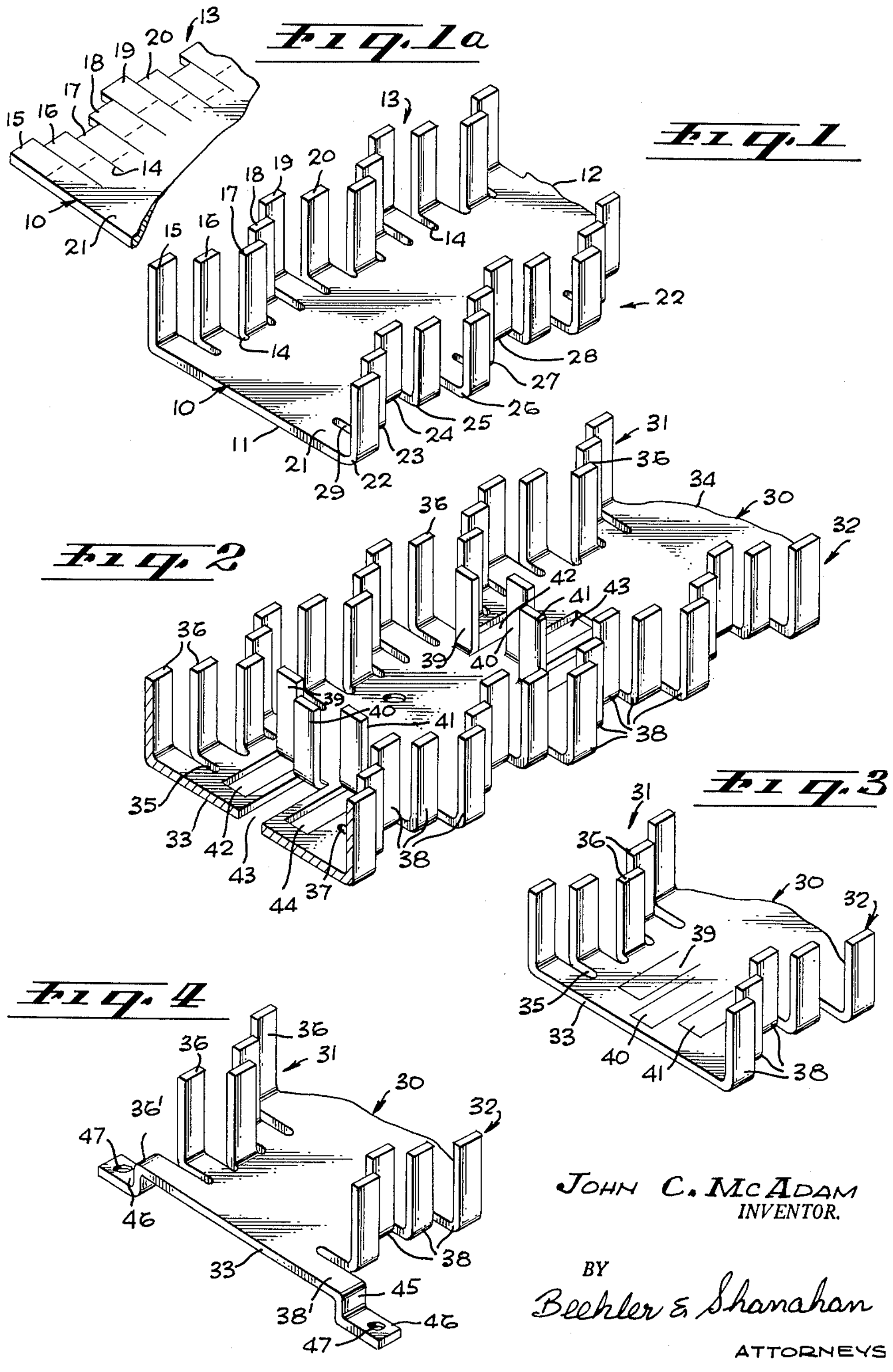
FIGURE 2 is a side perspective view of a basic strip which has been punched or scored in a slightly different pre-selected pattern providing fingers not only along the sides of the strip but also at locations intermediate the sides bent to form a more completely encircling enclosure.
FIGURE 3 is a side perspective fragmentary view of the same strip shown in FIGURE 2 but wherein the fingers intermediate the sides are shown only as scored areas prior to having been punched out.
FIGURE 4 is a fragmentary side perspective view showing still another use to which fingers of the basic pattern may be put.

In an embodiment of the invention chosen primarily for illustrative purposes there is shown a base strip 10 of sheet metal, preferably for practical purposes constituting aluminum showing one end 11 and showing a cut-off portion 12 at the other end which might exist anywhere along the length of a strip which can vary in length from a few inches to many feet. The base strip is provided along one side 13 with cut-outs or slits 14 spaced longitudinally along the side 13. The cut-outs may be merely scored portions or, if a neater finish is desired, may be punched-out areas to provide a clear demarcation between adjacent fingers 15, 16, 17, 18, 19, 20, etc. On those occasions where it is intended that the tops of the fingers be at some specified level, the side 13 may be initially punched or cut, as illustrated in FIGURE 1*a*, so that when bent at the dotted locations indicated the fingers will be of the same height above an upper area 21 of the base strip even though the overall length of the respective fingers is different, as is particularly evident in FIGURE 1*a*.

Similarly on the opposite side 22 are corresponding fingers 23, 24, 25, 26, 27, 28, etc., separated by corresponding cut-outs or slits 29. In this basic form of the device only the initially punched or scored pattern need be provided for inventory purposes in strips of any desired length and of selected breadth, depending upon the desired size and general capacity of the cooler. Fingers may be bent in the staggered relationship shown in FIGURE 1 on one side only of the base strip or may be bent alternately to opposite sides, either before or after individual lengths are severed from the base strip, depending upon whether the devices thus formed are for mounting one or a multiple of transistors.

The base strip, of course, is adapted to be drilled with suitable mounting holes and additional holes through which leads of the transistors can be passed. Further still, the full length of the respective fingers can be utilized by bending them near the inner ends of the slits 14 and 29, respectively, or, if desired, the fingers may be bent nearer the outer ends, thereby providing enclosures where the heights of the fingers are materially shorter. The bending, of course, can be varied at will to provide fingers of any height within the limits of the basic strip scored pattern. All of the fingers may be used or, if desired, only some of the fingers may be used. Those not used may be either left on the strip or punched therefrom or otherwise cut off.

In a second form of the device shown in FIGURES 2, 3 and 4 a slightly greater variety of expedients is possible, although the base strip 30 there shown is initially punched out or scored in the same fundamental pattern as has been described in connection with FIGURE 1. The base strip is represented as having two longitudinal sides 31 and 32, a cut-off end 33, and an end 34 which is indeterminate and may be at any location along an initial strip of indefinite length. Slits 35 on the side 31 provide fingers 36 and slits 37 on the side 32 provide for fingers 38. These may be staggered in the same relative relationship as shown in FIGURE 1 or the relationship may be varied slightly as desired so that the ultimate staggered effect will be somewhat different.

In this form of the device fingers or finger tabs 39, 40 and 41, for example, are provided for, as shown in FIGURE 3 as well as in FIGURE 2. The scoring is preferably entirely through the thickness of the strip and may be merely slits or, if desired, may be punched-out portions on three sides but leaving one side continuous with the strip. If these finger tabs are not needed, they may be permitted to remain, as shown in FIGURE 3. Where additional cooling is desired, the fingers may be punched out of the base strip, as shown in FIGURE 2, at the locations provided throughout the length of the strip. When punched out the fingers leave corresponding apertures 42, 43 and 44 which are of further assistance in aiding the dissipation of heat. As shown in FIGURE 2 each successive grouping of the fingers 39, 40 and 41 may be reversed or, if further unitformity in the basic pattern is preferably, they may be struck all in the same general direction and either staggered as shown or in alignment laterally.

To make still further use of the basic pattern, some fingers as, for example, fingers 36′ and 38′, may be bent in the opposite direction to provide risers 45 and feet 46 in which may be provided a hole 47 to receive a bolt or screw to assist in mounting the cooler upon a suitable chassis (not shown).

Figure 5:
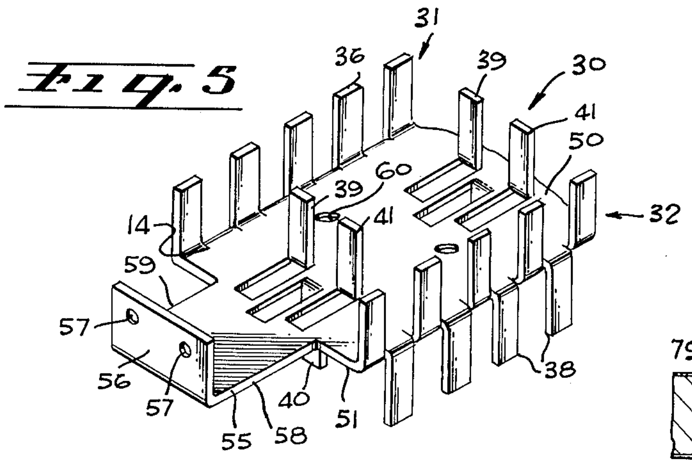
FIGURE 5 shows a fragmentary side perspective view of the same basic strip wherein a portion of the strip is diverted to still another type of supporting bracket and wherein the same fingers are bent to form still a different type of enclosure.
Figure 6:
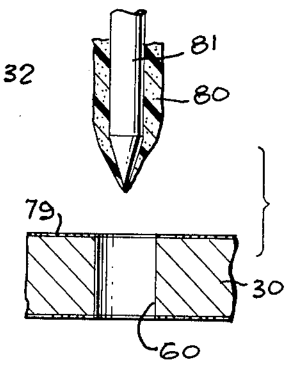
FIGURE 6 is a fragmentary sectional view through one of the mounting holes showing one step of a process for electrically insulating the wall of the hole.

A still further adaptation of the basic strip 30 is shown in FIGURE 5. In this form of device the fingers 36 on the side 31 are bent alternately. The same bending relationship applies to the fingers 38 so that the fingers form enclosures on both a face 50 of the strip and a face 51. The fingers 39, 40 and 41 may be similarly bent so that, for example, the fingers 39 and 41 assist in forming the enclosure on the face 50 and the fingers 40 assist in forming the closures on the opposite face 51. Here again, as previously indicated, there may be as many closures provided as needed from an initial long base strip 30 of any selected length. In the alternative individual enclosures only may be needed, in which event the strip can be cut off to a corresponding length.

Of special interest in this form of the device is the provision of a bracket 55 having a foot 56 with mounting holes 57 therein. The bracket comprises a portion of the same base strip 30 as initially provided. For neatness and convenience in the chosen embodiment the bracket has been cut along side edges 58 and 59 to remove unwanted portions of the base strip. Should space permit, the side edges need not be cut off but permitted to remain at whatever the breadth of the strip might be at the end where material is employed to form the bracket.

In the form of device shown in FIGURE 5 mounting holes 60 are shown for mounting a pair of transistors, one on each face 50 and 51. Even where a bracket may be used at one end, the strip may be cut off at the other end to provide two or more enclosures on each side formed in general by the fingers bent as shown. The variety of coolers heretofore defined will be understood as possible of formation from but a single base strip scored in only one manner. Double the variety of coolers can be had by employing no more than two base strips of different breadth. Where one base strip is of lesser breadth than the other, coolers formed therefrom will be smaller than coolers from the strip of greater breadth such that the coolers of smaller breadth can be employed when desired nested within the coolers of greater breadth, thereby to still further vary the units possible from this simple stock inventory of base strips.

Figure 8:
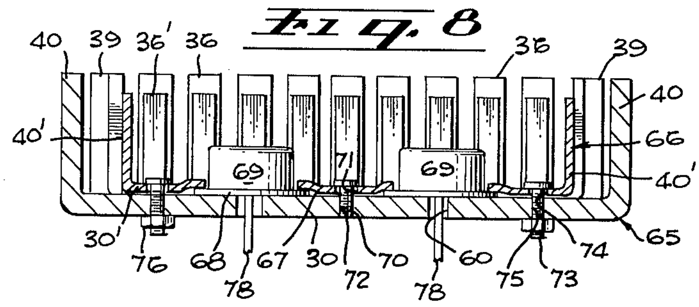
FIGURE 8 is a longitudinal sectional view showing basic parts of two strips of different size in nested relationship to provide coolers of precisely the same controlled capacity for two separate transistors.
Figure 7:
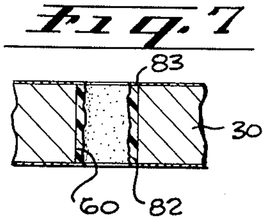
FIGURE 7 is a fragmentary sectional view showing the hole after insulation has been supplied.

Nesting as suggested is shown in FIGURE 8. In this form of device there is a further variation in that an exterior unit 65 is of material having a thicker gage than the gage of an interior unit 66. Occasions, however, may suggest that both units be of the same gage thickness. In this form of device the base strip 30 is of heavier gage and has the usual fingers 36, 39, 40, etc., bent therefrom, as already described. A base strip 30′ is of lighter gage and has fingers 36′, 40′ bent therefrom in the same general manner. The pattern suggested has been followed in the interest of simplifying inventory problems. The pattern, of course, is subject to some variation and change to suit circumstances without, however, departing from the basic concept of providing base strips scored in some standard fashion from which fingers may be bent as desired.

Further, as illustrated in FIGURE 8, the interior unit 66 may have the base strip formed with shallow cups 67 as shown adapted to receive a rim 68 of a transistor 69, thereby to firmly clamp the transistor between the base strips in a positive heat-conducting relationship. Screws 70 may pass through an open hole 71 of the base strip 30′ and threadedly engage a threaded hole 72 in the base strip 30. Other screws 73 may pass through open holes 74 and 75 in the respective strips 30' and 30 and be held in position by nuts 76.

The holes 60 are provided through which leads 78 from the transistors pass. Since these leads are often of bare wire, it is desirable to have no metal exposed within the holes 60. Even though the casing of the transistor itself may on occasions constitute a lead, grounding of the transistor upon the base strip 30 is prevented by the presence of an electrically insulating coating 79 which is thin enough and of such character that it does not impair the flow of heat by conduction from the transistor casing or jacket to the base strip. A suitable coating is that described in detail in Patent No. 2,964,688, this being in the main finely powdered molybdenum disulfide in a carrier of synthetic plastic polymerized resin having a thickness somewhere in the neighborhood of .001 inch.

To coat the exposed interior of the hole 60 with a suitable insulating material, a mass 80 of quick-setting synthetic plastic resin of some commercially available type may be applied to a skewer 81 as, for example, by dipping the skewer in the plastic and then injecting the skewer into the hole 60 so that a layer 82 of the plastic adheres to the wall of the hole 60 after the skewer is withdrawn and hardens in place. The layer, inasmuch as it is fluid when applied, will also adhere to an edge 83 of the coating 79 forming a junction therebetween. Since there need be no heat-conducting properties present in the layer 82 but merely electrically insulating properties, the simple coating expedient herein described is adequate.

In still another form of the device wherein the nesting relationship is illustrated, an exterior cooler enclosure 85 is shown as having a generally square pattern whereas an interior cooler enclosure 86 is shown as having a circular pattern. The exterior enclosure 85 consists of a base 87 having an interior wall of fingers 88 and an exterior wall of fingers 89, the fingers being in staggered relationship relative to each other. The interior enclosure has a flat base 90 with fingers 91 arranged in a circular pattern having a diameter small enough to nest within the inside fingers 88 of the exterior enclosure. The staggered relationship of the fingers 88 and 89 coupled with the circular relationship of the fingers 91 produces a particularly varied pattern of finger relationships which is very instrumental in creating a desired amount of turbulence as air circulates around and through the cooler thereby to greatly enhance the effectiveness of heat transfer from the transistor to the fingers and thence to the surrounding atmosphere.

To further simplify this last described arrangement the base 90 is not dished but permitted to remain perfectly flat. This is especially desirable when relatively heavy gage material is made use of. In this form, as illustrated in FIGURE 9*a*, the outside face of the base 90 rests directly upon a rim 92 of a transistor casing 93, an aperture 94 being provided in the base 90 to accommodate the casing. Screws 95 pass through the bases 90 and 87, respectively, to hold the parts together. Accordingly, the screws perform a multiple purpose, namely, that of holding the transistor in position as well as that of holding the two parts of the cooler in proper relationship.

In still another form of the device illustrated in FIGURE 10, an exterior cooler enclosure 98 is provided with a square pattern of fingers 99 in alignment and extending outwardly from a base 100. At each of two corners are fingers 101 of width slightly greater than the fingers 99. Relatively wide open spaces 102 are provided between fingers 101 and the adjacent finger 99 on one side whereas relatively narrow spaces 103 are employed between adjacent fingers 99. The form of device of FIGURE 10 may be used alone to mount a transistor 104 having a flange 105 of the kind shown. In the alternative the interior cooler enclosure 86 heretofore described in connection with FIGURES 9 and 9*a* may be mounted in the enclosure 98 in the same fashion and in place of the transistor 104. Moreover, in the event only small low capacity cooler enclosures might suffice, a cooler enclosure like the enclosure 86 may be employed alone and have one or more small transistors mounted upon the upper surface of the base 90.

The brief description of FIGURES 9, 9*a* and 10 herein given is further evidence of the great variety of cooling capacity which can be enjoyed from the employment of a few simple forms of enclosures of such sizes that they can be used in conjunction with each other, either nested as shown in FIGURES 9 and 9*a* or again in back to back relationship, either singly or nested. By adhering to the employment of sheet metal base strips of either continuous length or in separate stamped patterns suitable for the forming of the devices of FIGURES 9 and 10, fingers may be bent from simple base plates in a great variety of fashions to accommodate transistors on one or both sides and in a fashion furthermore so that enclosures of different sizes can be matched with each other to achieve a great variety of mountings for a corresponding variety of demands.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A variable cooler device for electronic component means comprising a base strip having a plurality of base areas for mounting said component means, a group of individual fingers having inner ends secured to said base areas, each said finger having a potentially bendable section adjacent said inner end, one set of said fingers being bent at an angle relative to one of said areas enclosing at least a portion of one of said areas whereby to provide a cooling enclosure, and another set of said fingers being bent at an angle relative to another of said areas enclosing at least a portion of said other of said areas providing another cooling enclosure, said areas comprising separate mounting means receptive of components when said areas are in relationship separate from each other and in the alternative when said areas are joined one with the other.

2. A variable cooler device for electronic component means comprising base areas of sheet material for mounting said component means, a group of individual fingers of said sheet material having inner ends secured to said base areas, each said finger having a potentially bendable section adjacent said inner end, one set of said fingers being bent at an angle relative to one of said areas whereby to provide a cooling enclosure, and another set of said fingers being bent at an angle relative to another of said areas providing another cooling enclosure, said areas comprising mounting means receptive of components, a portion of said sheet material extending from said base areas forming a support for securing the cooler device to a chassis.

3. A variable cooler device for electronic components comprising a strip of predetermined breadth and of arbitrary length, said strip having slits extending inwardly from opposite side edges forming a series of separate finger sections on each side of the strip having bases of said fingers joined to the strip, said fingers having each a potentially bendable section at a location inwardly from the adjacent side edge of the strip whereby said fingers are adapted to be bent in the alternative toward either face of the strip whereby to provide cooling enclosures for components, said strip being selectively severable at locations intermediate ends thereof whereby to provide separate cooler devices of selective capacity.

4. A variable cooler device for electronic components comprising a strip of predetermined breadth and of arbitrary length, a series of separate fingers on each side of the strip having bases of said fingers joined to the strip, said fingers having each a potentially bendable section adjacent the side of the strip whereby said fingers are adapted to be bent in the alternative toward either face of the strip whereby to provide cooling enclosures for components, said strip at areas between said sides and at spaced locations along the length having partially cut finger tabs each joined at one end to the base and extending in a direction transverse to the direction of the first identified fingers, said tabs being adapted to be selectively bent outwardly of the base from a face thereof and extending between series of fingers on respective sides of the strip whereby to provide additional side surface means for at least one of said enclosures.

5. A variable cooler device for electronic components comprising a strip of sheet metal, a series of separate fingers at sides of the strip having bases of said fingers joined to the strip, said fingers each being bent adjacent the side of the strip whereby some of said fingers are bent toward one face of the strip and others of said fingers are bent toward the opposite face of the strip whereby to provide cooling enclosures for components on opposite sides of the strip, said strip at an area intermediate opposite side edges and at spaced locations having partially cut finger tabs each joined at one end to the base, some of said tabs being bent outwardly of the base from one face thereof and others of said tabs being bent from the other face whereby to provide additional side surface means for said enclosures.

6. A variable cooler device for electronic components comprising a strip of sheet metal, a series of separate fingers at sides of the strip having bases of said fingers joined to the strip, said fingers each being bent adjacent the side of the strip whereby some of said fingers are bent toward one face of the strip and others of said fingers are bent toward the opposite face of the strip whereby to provide cooling enclosures for components, said strip at an intermediate area having partially cut finger tabs each joined at one end to the base, at least some of said tabs being bent outwardly of the base from a face thereof whereby to provide additional side surface means for at least one of said enclosures, said strip comprising in part a bracket portion extending outwardly relative to said fingers for mounting the enclosures upon a chassis.

7. A variable cooler device for electronic component means comprising base areas for mounting said component means, a group of individual fingers having inner ends secured to said base areas, each said finger having a potentially bendable section adjacent said inner end, one set of said fingers being bent at an angle relative to one of said areas whereby to provide a cooling enclosure, and another set of said fingers being bent at an angle relative to another of said areas to provide another cooling enclosure, said areas comprising mounting means receptive of components, said base on the surface thereof having a relatively thin coating of electrically insulating heat conducting material and having at least one aperture therethrough for an electric lead, and a separate electrically insulative film different from said thin coating covering the inside surface of the aperture and connected to said thin film at the end of the aperture.

References Cited by the Examiner

UNITED STATES PATENTS

| | | | |
|---|---|---|---|
| 2,974,263 | 3/61 | Akins | 317—100 |
| 2,984,774 | 5/61 | Race | 174—16 |

OTHER REFERENCES

Electronic Design, July 5, 1962, p. 16.

International Electronic Research Corp., March 10, 1961, p. 128.

JOHN F. BURNS, *Primary Examiner.*